United States Patent
Hartig et al.

(10) Patent No.: US 8,930,261 B2
(45) Date of Patent: Jan. 6, 2015

(54) METHOD AND SYSTEM FOR GENERATING A FRAUD RISK SCORE USING TELEPHONY CHANNEL BASED AUDIO AND NON-AUDIO DATA

(75) Inventors: David Hartig, Oakland, CA (US); Anthony Rajakumar, Fremont, CA (US); Lisa Marie Guerra, Los Altos, CA (US); Richard Gutierrez, Mountain View, CA (US)

(73) Assignee: Verint Americas Inc., Alpharetta, GA (US)

( * ) Notice: Subject to any disclaimer, the term of this patent is extended or adjusted under 35 U.S.C. 154(b) by 271 days.

(21) Appl. No.: 12/856,118

(22) Filed: Aug. 13, 2010

(65) Prior Publication Data
US 2010/0303211 A1    Dec. 2, 2010

Related U.S. Application Data

(63) Continuation-in-part of application No. 11/404,342, filed on Apr. 14, 2006.

(60) Provisional application No. 61/335,677, filed on Jan. 11, 2010, provisional application No. 60/673,472, filed on Apr. 21, 2005.

(51) Int. Cl.
*G06Q 40/00* (2012.01)

(52) U.S. Cl.
USPC ............................................. 705/38; 705/35

(58) Field of Classification Search
USPC ......................................................... 705/38
See application file for complete search history.

(56) References Cited

U.S. PATENT DOCUMENTS

| | | | |
|---|---|---|---|
| 4,653,097 A | 3/1987 | Watanabe et al. | |
| 5,805,674 A | 9/1998 | Anderson, Jr. | |
| 5,907,602 A | 5/1999 | Peel et al. | |
| 5,963,908 A | 10/1999 | Chadha | |
| 5,999,525 A * | 12/1999 | Krishnaswamy et al. | .... 370/352 |
| 6,044,382 A | 3/2000 | Martino | |
| 6,145,083 A | 11/2000 | Shaffer et al. | |

(Continued)

FOREIGN PATENT DOCUMENTS

| EP | 0598469 A2 | 5/1994 |
|---|---|---|
| JP | 2004-193942 | 7/2004 |

(Continued)

OTHER PUBLICATIONS

Goshi, S Majima; Content Transmission method of content authentication system, involves applying hash function to extracted feature value of content to obtain hash value which is enciphered to obtain content authentication data; Jan. 8, 2009; Apr. 7, 2004.*

(Continued)

*Primary Examiner* — Ella Colbert
*Assistant Examiner* — Michael Cranford
(74) *Attorney, Agent, or Firm* — Meunier Carlin & Curfman

(57) ABSTRACT

Disclosed is a method for generating a fraud risk score representing a fraud risk associated with an individual, the method comprising: a) determining a telephony channel risk score from at least one of audio channel data and non-audio channel data of the individual; and b) generating the fraud risk score based on at least one of the telephony channel risk score, the audio channel data, and the non-audio channel data.

17 Claims, 4 Drawing Sheets

(56) References Cited

U.S. PATENT DOCUMENTS

| | | |
|---|---|---|
| 6,266,640 B1 | 7/2001 | Fromm |
| 6,427,137 B2 | 7/2002 | Petrushin |
| 6,510,415 B1 | 1/2003 | Talmor et al. |
| 6,587,552 B1 | 7/2003 | Zimmermann |
| 6,597,775 B2 | 7/2003 | Lawyer et al. |
| 7,039,951 B1 | 5/2006 | Chaudhari et al. |
| 7,158,622 B2 | 1/2007 | Lawyer et al. |
| 7,212,613 B2 | 5/2007 | Kim et al. |
| 7,386,105 B2 | 6/2008 | Wasserblat et al. |
| 7,539,290 B2 | 5/2009 | Ortel |
| 7,657,431 B2 | 2/2010 | Hayakawa |
| 7,668,769 B2 | 2/2010 | Baker et al. |
| 7,778,832 B2 | 8/2010 | Broman et al. |
| 7,822,605 B2 | 10/2010 | Zigel et al. |
| 7,908,645 B2 * | 3/2011 | Varghese et al. .................. 726/4 |
| 7,940,897 B2 | 5/2011 | Khor et al. |
| 8,036,892 B2 | 10/2011 | Broman et al. |
| 8,073,691 B2 | 12/2011 | Rajakumar |
| 8,112,278 B2 | 2/2012 | Burke |
| 8,311,826 B2 | 11/2012 | Rajakumar |
| 8,510,215 B2 | 8/2013 | Gutierrez et al. |
| 8,537,978 B2 | 9/2013 | Jaiswal et al. |
| 2001/0026632 A1 | 10/2001 | Tamai |
| 2002/0099649 A1* | 7/2002 | Lee et al. ........................ 705/38 |
| 2003/0147516 A1 | 8/2003 | Lawyer et al. |
| 2003/0208684 A1 | 11/2003 | Camacho et al. |
| 2004/0029087 A1 | 2/2004 | White |
| 2004/0111305 A1 | 6/2004 | Gavan et al. |
| 2004/0131160 A1 | 7/2004 | Mardirossian |
| 2004/0167964 A1 | 8/2004 | Rounthwaite et al. |
| 2004/0203575 A1 | 10/2004 | Chin et al. |
| 2004/0240631 A1 | 12/2004 | Broman et al. |
| 2005/0043014 A1 | 2/2005 | Hodge |
| 2005/0076084 A1 | 4/2005 | Loughmiller et al. |
| 2005/0125226 A1 | 6/2005 | Magee |
| 2005/0125339 A1 | 6/2005 | Tidwell et al. |
| 2005/0185779 A1 | 8/2005 | Toms |
| 2006/0106605 A1 | 5/2006 | Saunders et al. |
| 2006/0161435 A1 | 7/2006 | Atef et al. |
| 2006/0212407 A1 | 9/2006 | Lyon |
| 2006/0212925 A1 | 9/2006 | Shull et al. |
| 2006/0248019 A1 | 11/2006 | Rajakumar |
| 2006/0282660 A1 | 12/2006 | Varghese et al. |
| 2006/0285665 A1 | 12/2006 | Wasserblat et al. |
| 2006/0289622 A1 | 12/2006 | Khor et al. |
| 2006/0293891 A1 | 12/2006 | Pathuel |
| 2007/0041517 A1 | 2/2007 | Clarke et al. |
| 2007/0074021 A1 | 3/2007 | Smithies et al. |
| 2007/0124246 A1 | 5/2007 | Lawyer et al. |
| 2007/0280436 A1 | 12/2007 | Rajakumar |
| 2007/0282605 A1 | 12/2007 | Rajakumar |
| 2008/0010066 A1 | 1/2008 | Broman et al. |
| 2008/0195387 A1 | 8/2008 | Zigel et al. |
| 2009/0046841 A1 | 2/2009 | Hodge |
| 2009/0119106 A1 | 5/2009 | Rajakumar et al. |
| 2009/0147939 A1 | 6/2009 | Morganstein et al. |
| 2009/0254971 A1* | 10/2009 | Herz et al. ........................ 726/1 |
| 2010/0228656 A1* | 9/2010 | Wasserblat et al. ............. 705/35 |
| 2010/0305946 A1 | 12/2010 | Gutierrez |
| 2010/0305960 A1 | 12/2010 | Gutierrez |
| 2011/0026689 A1 | 2/2011 | Metz et al. |
| 2011/0191106 A1 | 8/2011 | Khor et al. |
| 2011/0255676 A1* | 10/2011 | Marchand et al. ....... 379/114.14 |
| 2011/0320484 A1 | 12/2011 | Smithies et al. |
| 2012/0053939 A9 | 3/2012 | Gutierrez et al. |
| 2012/0054202 A1 | 3/2012 | Rajakumar |
| 2012/0072453 A1 | 3/2012 | Guerra et al. |
| 2012/0253805 A1 | 10/2012 | Rajakumar et al. |
| 2012/0254243 A1 | 10/2012 | Zeppenfeld et al. |
| 2012/0263285 A1 | 10/2012 | Rajakumar et al. |
| 2012/0284026 A1 | 11/2012 | Cardillo et al. |
| 2013/0197912 A1 | 8/2013 | Hayakawa et al. |
| 2013/0253919 A1 | 9/2013 | Gutierrez et al. |

FOREIGN PATENT DOCUMENTS

| | | |
|---|---|---|
| JP | 2006038955 | 9/2006 |
| WO | 0077772 | 12/2000 |
| WO | 2006/013555 | 2/2006 |
| WO | 2007/001452 | 1/2007 |

OTHER PUBLICATIONS

Loughmiller, Collier J; Message classification method in computer communication network, involves applying machine learning technique to recognize pattern of incoming messages, to classify messages; Feb. 4, 2012; Mar. 2, 2005.*

Goodman HD; Junk mail filtering system for laptop computer, employs new filter if new false positive rate and negative rate are better than false positive and negative rate of seed filter; May 5, 2013; Jun. 3, 2004.*

* cited by examiner

300 — Determine a telephony channel risk score from at least one of audio channel data and non-audio channel data of an individual 302 — Generate a fraud risk score based on at least one of the telephony channel risk score, the audio channel data, and the non-audio channel data.

METHOD AND SYSTEM FOR GENERATING A FRAUD RISK SCORE USING TELEPHONY CHANNEL BASED AUDIO AND NON-AUDIO DATA

RELATED APPLICATIONS

This application is a continuation-in-part of the U.S. patent application Ser. No. 11/404,342 filed Apr. 14, 2006, which in turn claims priority benefit to U.S. provisional patent application Ser. No. 60/673,472, titled "Detecting fraudulent use of financial account numbers using voiceprints" and filed Apr. 21, 2005. This application claims the benefit of priority to the U.S. application Ser. No. 61/335,677 filed Jan. 11, 2010.

TECHNICAL FIELD OF THE DISCLOSURE

Embodiments of the disclosure relate to a method and system to generate a risk score for a caller.

BACKGROUND OF THE DISCLOSURE

Modern enterprises such as merchants, banks, insurance companies, telecommunications companies, and payments companies are susceptible to many forms of fraud, but one form that is particularly pernicious is credit card fraud. With credit card fraud, a fraudster fraudulently uses a credit card or credit card credentials (name, expiration, etc.) of another to enter into a transaction for goods or services with a merchant.

Another form of fraud that is very difficult for merchants, particularly large merchants, to detect, if at all, occurs in the job application process where an applicant has been designated as undesirable in the past—perhaps as a result of having been fired from the employ of the merchant at one location or for failing a criminal background check—fraudulently assumes a different identity and then applies for a job with the same merchant at a different location. In such cases, failure to detect the fraud could result in the rehiring of the fraudster to the detriment of the merchant. If the fraudster has assumed a new identity, background checks based on identity factors such as names or social security numbers become essentially useless. For example consider that case of a large chain store, such as, for example, Walmart. In this case, an employee can be terminated for say theft at one location, but then rehired under a different identity at another location. The employee represents a grave security risk to the company particularly since the employee, being familiar with the company's systems and internal procedures will be able to engage in further conduct injurious to the company.

SUMMARY OF THE DISCLOSURE

In one aspect, the present disclosure provides a method for generating a fraud risk score representing a fraud risk associated with an individual, the method comprising: a) determining a telephony channel risk score from at least one of audio channel data and non-audio channel data of the individual; and b) generating the fraud risk score based on at least one of the telephony channel risk score, the audio channel data, and the non-audio channel data.

In another aspect, the present disclosure provides a risk score calculator for generating a fraud risk score representing a fraud risk associated with an individual, the system comprising: a) a telephony risk score calculator capable of determining a telephony channel risk score from at least one of audio channel data and non-audio channel data of the individual; and b) an aggregate risk score generator capable of generating the fraud risk score based on at least one of the telephony channel risk score, the audio channel data, and the non-audio channel data.

In yet another aspect of the present disclosure, the present disclosure provides computer-implemented methods, computer systems and a computer readable medium containing a computer program product for generating a fraud risk score representing a fraud risk associated with an individual, the computer program product comprising: a) program code for determining a telephony channel risk score from at least one of audio channel data and non-audio channel data of the individual; and b) program code for generating the fraud risk score based on at least one of the telephony channel risk score, the audio channel data, and the non-audio channel data.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

Figure 1:
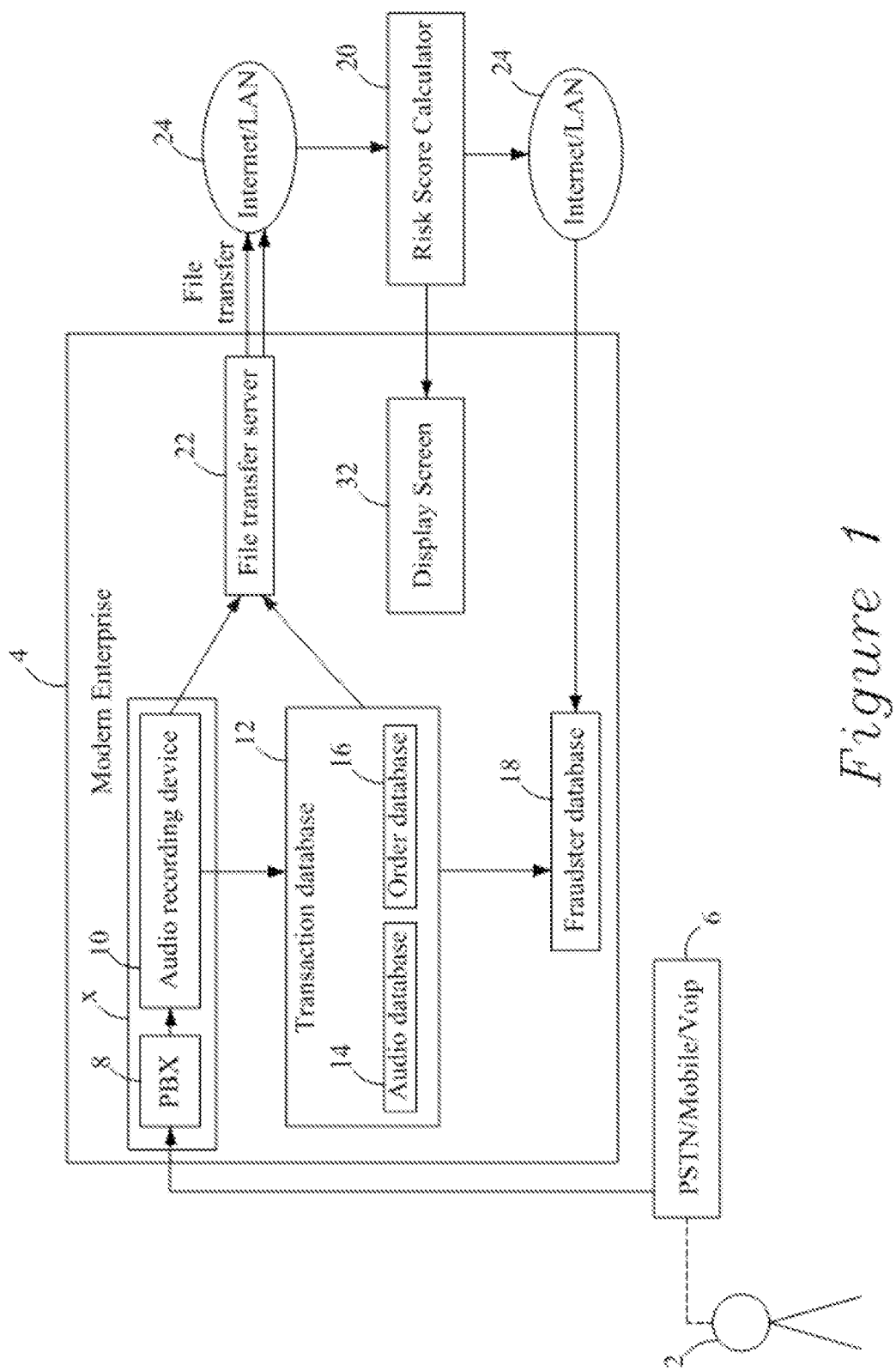
FIG. 1 shows a pictorial representation of a system used for calculating an Aggregate Fraud Risk Score, in accordance with an embodiment of the present disclosure.

The method and system have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

In the following description, for purposes of explanation, numerous specific details are set forth in order to provide a thorough understanding of the disclosure. It will be apparent, however, to one skilled in the art, that the disclosure may be practiced without these specific details. In other instances, structures and devices are shown at block diagram form only in order to avoid obscuring the disclosure.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Broadly, embodiments of the present disclosure calculate an Aggregate Fraud Risk Score (AFRS) representing a fraud risk associated with an individual who called a modern enterprise such as merchants, banks, insurance companies, telecommunications companies, and payments companies. The AFRS is calculated based on an audio channel risk score and a non-audio channel risk score. The audio channel risk score is calculated based on an analysis of a first set of parameters i.e. audio channel data associated with an audio of the individual. The non-audio channel risk score is calculated based on an analysis of a second set of parameters i.e. non-audio channel data associated with non-audio information related to the individual. The AFRS may be used in an automated system or in a system with an agent review. The AFRS along with other pieces of information may help in making a final decision on the individual that whether the individual should be accepted, rejected, or investigated further. Further, the final decision along with the other information may be displayed on a display screen.

Referring to FIG. 1, a pictorial representation of a system used for calculating an Aggregate Fraud Risk Score (AFRS) is shown, in accordance with an embodiment of the present disclosure. In one embodiment, a caller 2 may call a modern enterprise 4 using a suitable telephone network such as PSTN/Mobile/VoIP 6 for placing an order for goods or services. In one embodiment, a Private Branch Exchange (PBX) 8 may be used to receive the call. The PBX 8 may send the call audio to an audio recording device 10 which may record the call audio. In one embodiment, a call-center 'X' may receive and record the call on behalf of the modern enterprise 4, however, in another embodiment, the modern enterprise 4 may employ an agent (in house or outsourced) or any other third party to receive and record the call.

The audio recording device 10 may be configured to transmit the recoded call to a database 12. The database 12 includes phone details of all possible calls received at the modern enterprise 4. In one embodiment, the phone details may include at least one of an audio conversation between the modern enterprise 4 and the callers, an amount of the transaction, type of goods or services ordered for (in case of a credit card transaction), a time of call, quantity of goods, reason for the call like placing an order or checking status, credit card credentials, a recipient of the goods, a place of shipment, billing address, caller identity such as a name and/ or a social security number of the caller or agent ID (in case of an agent) or an employee ID number, a phone number from which the call is made, a phone number to which the call is made, and other transaction information. In one embodiment, the database 12 may include an audio database 14 and an order database 16. The audio database 14 is capable of storing call audios and the order database 16 is capable of storing order details.

The modern enterprise 4 may also include a fraudster database 18. The fraudster database 18 includes voice prints of known fraudsters. Essentially, a voice print includes a set of voice characteristics that uniquely identify a person's voice. In one embodiment, each voice print in the fraudster database 18 is assigned a unique identifier (ID), which in accordance with one embodiment may include one or more incident details such as a social security number used, a name used, credit card credentials used, date and time of fraud, an amount of the fraud, a type of fraud, enterprise impacted, and other details associated with the fraud incident.

In one embodiment, the phone details of all callers may be transmitted to a Risk Score Calculator (RSC) 20 via a file transfer server 22 using internet/LAN 24. The RSC 20 helps in generating an Aggregate Fraud Risk Score (AFRS) representing a fraud risk associated with the caller 2 who called the modern enterprise 4. In one embodiment, the RSC 20 may be a distributed system that includes components that are not all located at a single location, but instead are distributed over multiple locations. The RSC 20 may include software to facilitate communications with the modern enterprise 4 or the call-center 'X' to access the database 12. In one embodiment, the software may include a browser which is an application that facilitates communications via the Internet with the modern enterprise 4 or the call center 'X' using networking protocols such as for example the Hypertext Transfer Protocol (HTTP)/the Internet Protocol (IP), the Simple Object Access Protocol (SOAP), etc. In another embodiment, the EFD may be integrated in the modern enterprise 4, thereby alleviating the need of transferring the phone details of callers.

Figure 2:
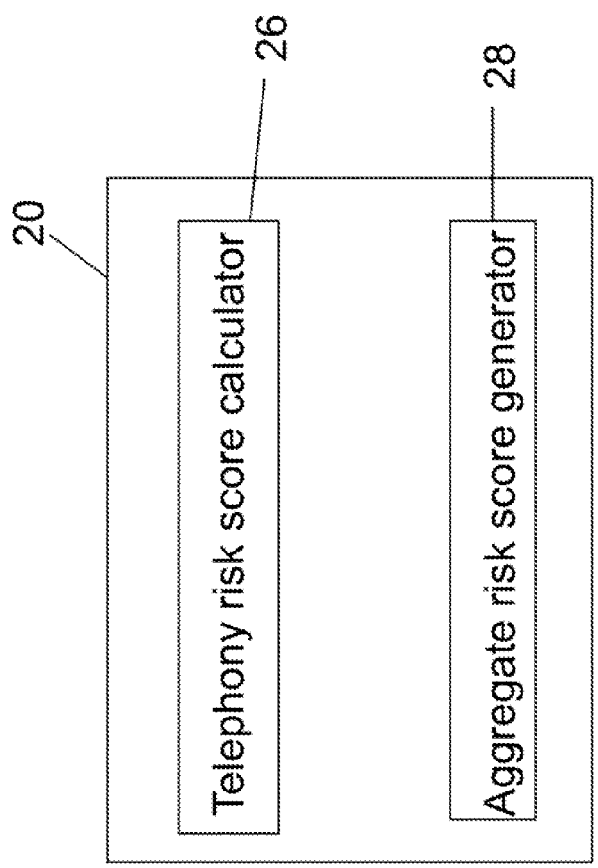
FIG. 2 shows a high level block diagram of an Risk Score Calculator, in accordance with one embodiment of the present disclosure.

Referring now to FIG. 2, an internal block diagram of the RSC 20 is shown, in accordance with an embodiment of the present disclosure. The RSC 20 includes a telephony risk score calculator (TRSC) 26 and an aggregate risk score generator 28. Each of the components 26 and 28 may be implemented in hardware or in software or as a combination of both hardware and software. Further, it is to be understood that while the components 26 and 28 are shown as separate components based on function, some or all the components may be integrated.

In one embodiment, the TRSC 26 may generate a telephony channel risk score from at least one of audio channel data and non-audio channel data of the caller 2. Subsequently, the aggregate risk score generator 28 may generate a fraud risk score based on at least one of the telephony channel risk score, the audio channel data and the non-audio channel data. For each piece of data (whether audio channel data or non-audio channel data), either a score (e.g. likelihood that their voice matches a known fraudster), the data itself (e.g. geographic location of the handset), or both are retrieved. The collection of scores/data gets fed into the aggregate risk score generator 28 for the generation of the fraud risk score.

In one embodiment, the audio channel data may include at least one of an emotion such as stress in the voice sample of the caller 2 when the caller 2 responded to specific questions designed to trigger stress in fraudsters but not in legitimate callers, a voice audio sample of the caller 2 to determine whether the voice sample of the caller 2 matches with a known fraudster by using speaker identification techniques. The speaker identification techniques are generally helpful because fraudsters tend to commit the same crime multiple times once a specific scheme is known to be success, resulting in multiple telephone calls by the same individual when committing fraud on the phone. Further, the first set of parameters may include keywords in the voice sample of the caller 2 and how the voice sample relates to keywords commonly used by known fraudsters, a telephony system used by the caller 2 i.e. whether Public Switched Telephone Network, a mobile phone, and Voice Over Internet Protocol network is being used, a geographic location of the caller 2.

In the present embodiment, the non-audio channel data may include at least one of a phone number called from, a phone number called to, a time duration for which the caller 2 has had the phone number called from, a call frequency to/from the phone number called from, the area code of the phone number called from, number of routing hops needed to complete the call (indication of how far away the call is coming from), geography associated with an area code of the phone number called from, geographical location of the caller 2, whether the caller 2 called from an expected phone number or a non-published number, whether the phone number is being call-forwarded and when that call-forward was initiated, an identity data, transaction data, and Short Message Service channel data.

The identity data may include at least one of a name, social security number, address, phone number, answers to questions about their background (like previous addresses lived at, persons that they shared a residence with, mother's maiden name, color of first car, etc. The transaction data may include at least one of a shipping/recipient address, recipient name, goods ordered, amount of transaction, type of payment (e.g. credit card, Pay Pal, wire, etc.), type and frequency of recent actions (e.g. status checks, change of address, ect.). Further, the SMS channel data may include at least one of a phone number of phone used to send SMS.

Subsequent to the generation of the aggregate fraud risk score, it may be used by an automated system or in a system with agent review. The RSC 20 may also integrate the AFRS against a list of known fraudsters. Further, the RSC 20 may additionally incorporate the fraud data associated with individual fraudster's past fraud activity. In other words, the RSC 20 compares the application or transaction data of the individual with that of individual fraudster's fraud data.

In one embodiment, when the AFRS is used in a system with manual agent review, the aggregate fraud risk score as well as many other pieces of information can be used to help them in making a final determination on an individual (e.g. accept, reject, or investigate further). Thereafter, data about the person being screened and data about each potential match in the DB are displayed on a display screen as shown in FIG. 1. Data about the person being screened may include transaction amount, geographical info (maybe fraud is more prevalent in city x), response delay—amount of time the screening takes before answering a question. If they take longer than average, it may indicate that they are looking up (stolen) information. Further, data about each potential match in the DB may include a voice match score (score that tells how closely the individual matches a voiceprint of a fraudster in the fraudster database 18), data about the match's previous fraud incidents (there may be many fraud incidents associated with the individual), damage amounts (exact amount or approximate—e.g. $0-99; $100-500; etc), geographical info, fraud type (i.e. credit card not-present fraud, credit card issuance fraud, etc.), classification: definite fraudster, suspicious activity, etc.

Figure 3:
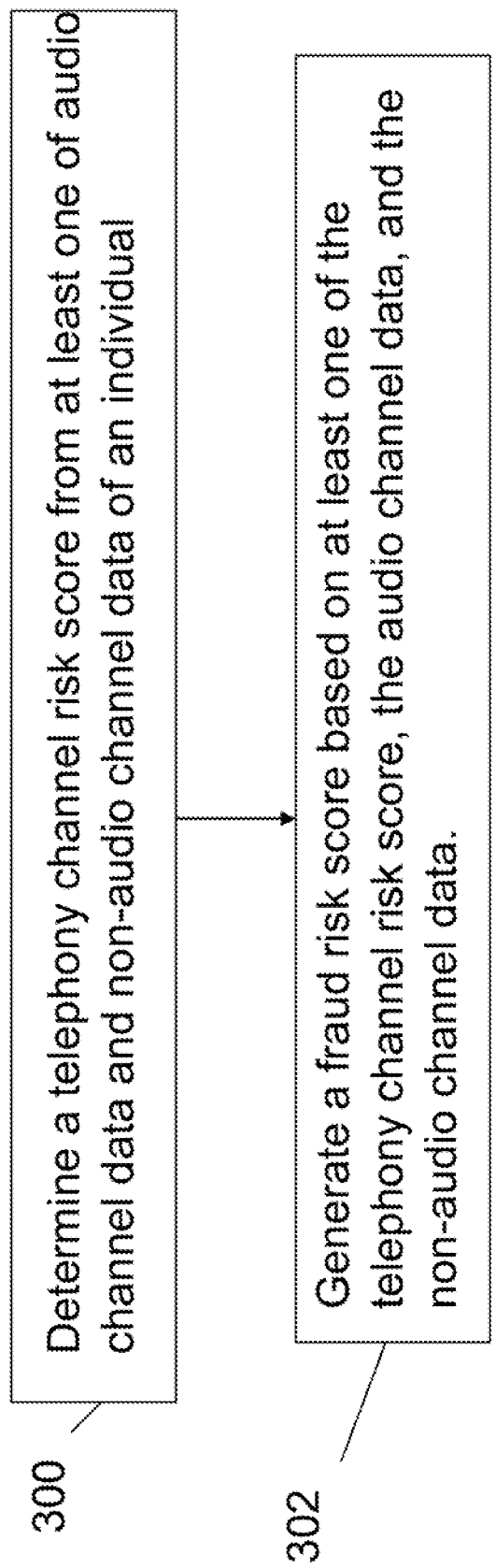
FIG. 3 shows a high level flowchart of a method for generating a fraud risk score representing a fraud risk associated with an individual, in accordance with an embodiment of the present disclosure.

Referring to FIG. 3, a high level flowchart of a method for generating a fraud risk score representing a fraud risk associated with an individual is shown, in accordance with an embodiment of the present disclosure. At 300, a telephony channel risk score is generated from at least one of audio channel data and non-audio channel data of the caller 2. Subsequently, at 302 the aggregate risk score generator 28 may generate a fraud risk score based on at least one of the telephony channel risk score, the audio channel data and the non-audio channel data.

Figure 4:
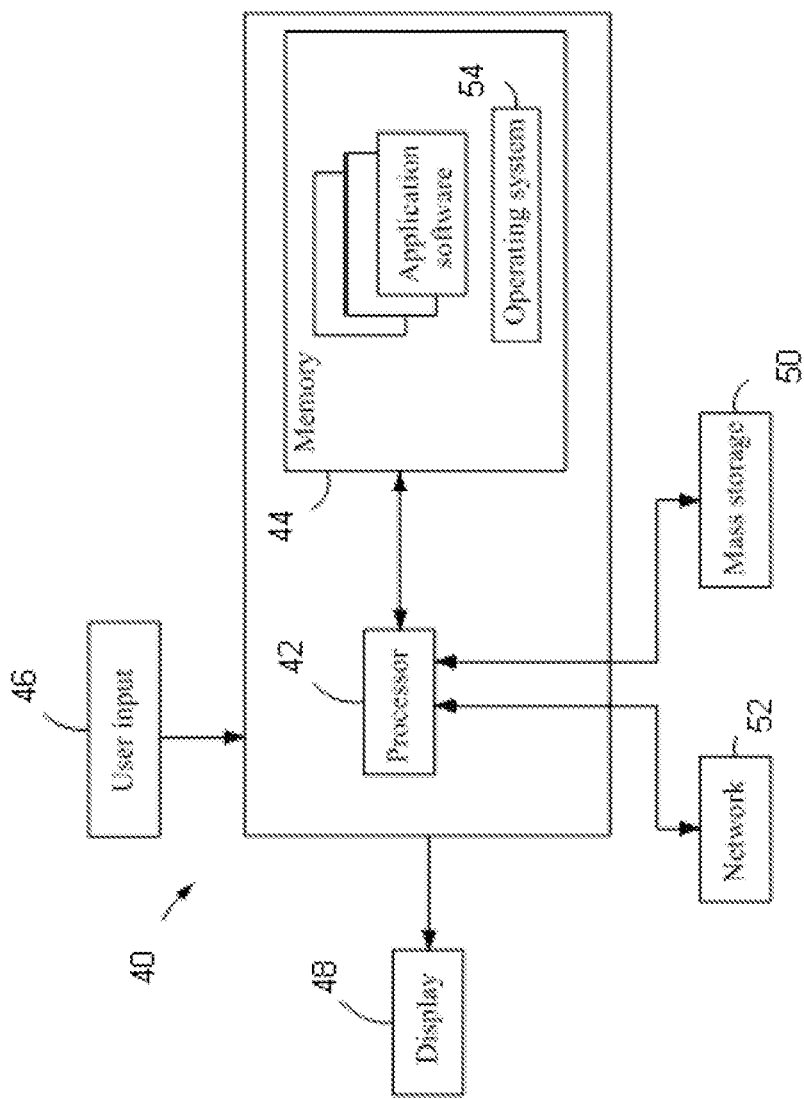
FIG. 4 shows hardware to implement the method disclosed herein, in accordance with an embodiment of the present disclosure.

Referring now FIG. 4, hardware 40 to implement the method disclosed herein is shown, in accordance with an embodiment of the present disclosure. The RSC 20, thus far, has been described in terms of their respective functions. By way of example, each of the RSC 20 may be implemented using the hardware 40 of FIG. 4. The hardware 40 typically includes at least one processor 42 coupled to a memory 44. The processor 42 may represent one or more processors (e.g., microprocessors), and the memory 44 may represent random access memory (RAM) devices comprising a main storage of the system 40, as well as any supplemental levels of memory e.g., cache memories, non-volatile or back-up memories (e.g. programmable or flash memories), read-only memories, etc.

In addition, the memory 44 may be considered to include memory storage physically located elsewhere in the system 40, e.g. any cache memory in the processor 42, as well as any storage capacity used as a virtual memory, e.g., as stored on a mass storage device 50.

The system 40 also typically receives a number of inputs and outputs for communicating information externally. For interface with a user or operator, the system 40 may include one or more user input devices 46 (e.g.; a keyboard, a mouse, etc.) and a display 48 (e.g., a Liquid Crystal Display (LCOD) panel).

For additional storage, the system 40 may also include one or more mass storage devices 50, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the system 40 may include an interface with one or more networks 52 (e.g., a local area network (LAN), a wide area network (WAN), a wireless network, and/or the Internet among others) to permit the communication of information with other computers coupled to the networks. It should be appreciated that the system 40 typically includes suitable analog and/or digital interfaces between the processor 42 and each of the components 44, 46, 48 and 52 as is well known in the art.

The system 40 operates under the control of an operating system 54, and executes various computer software applications, components, programs, objects, modules, etc. to perform the respective functions of the RSC 20 and server system of the present disclosure. Moreover, various applications, components, programs, objects, etc. may also execute on one or more processors in another computer coupled to the system 40 via a network 52, e.g. in a distributed computing environment, whereby the processing required, to implement the functions of a computer program may be allocated to multiple computers over a network.

In general, the routines executed to implement the embodiments of the present disclosure, may be implemented as part of an operating system or a specific applications component, program, object, module or sequence of instructions referred to as "computer programs." The computer programs typically comprise one or more instructions set at various times in various memory and storage devices in a computer, and that, when read and executed by one or more processors in a computer; cause the computer to perform operations necessary to execute elements involving the various aspects of the present disclosure. Moreover, while the disclosure has been described in the context of fully functioning computers and computer systems, those skilled in the art will appreciate that the various embodiments of the present disclosure are capable of being distributed as a program product in a variety of forms, and that the present disclosure applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

We claim:

1. A method for generating fraud risk scores representing fraud risks associated with an individual, the method comprising:

determining calculating an audio channel fraud risk score from audio channel data of the individual comprising at least one of an emotion or stress extracted from an audio signal representing a voice sample of the individual when the individual responded to specific questions designed to trigger stress in fraudsters but not in legitimate callers, the voice sample of the individual, and keywords extracted from the audio signal of the voice sample, the audio channel fraud risk score calculated by a computer processor coupled to a memory and including a telephony risk score calculator;

determining calculating a non-audio channel fraud risk score from non-audio channel data of the individual, the non-audio channel data comprising at least one of a type of telephony system used by the individual and a geographic location of the individual, the non-audio channel fraud risk score calculated by the telephony risk score calculator; and generating an aggregate fraud risk score based on the audio channel fraud risk score and the non-audio channel fraud risk score, the aggregate fraud risk score generated by an aggregate risk score generator included in the computer processor coupled to a memory.

2. The method of claim 1, wherein the telephony system comprises one of a Public Switched Telephone Network, a mobile phone, and Voice Over Internet Protocol network.

3. The method of claim 1, wherein the non-audio channel data comprises at least one of a phone number called from, a phone number called to, a time duration for which the individual has had the phone number, a call frequency to/from the phone number called from, the area code of the phone number called from, a number of routing hops needed to complete the call, geography associated with an area code of the phone number called from, geographical location of the individual, whether the individual called from an expected phone number or a non-published number, whether the phone number is being call-forwarded and when that call forward was initiated, an identity data, transaction data, and Short Message Service channel data.

4. The method of claim 3, wherein the identity data comprises at least one of a name of the individual, a Social Security Number of the individual, an address of the individual, a phone number from which the individual called, and information related to background of the individual.

5. The method of claim 4, wherein the information related to the background of the individual includes at least one of previous addresses lived at, persons that the individual shared a residence with, mother's maiden name, and a color of a first car.

6. The method of claim 1, wherein the audio channel data includes a voice sample of the individual and one or more keywords used by the individual, and the non-audio channel data includes order data associated with an order placed by the individual.

7. A risk score calculator for generating a fraud risk score representing a fraud risk associated with an individual, the calculator comprising:

a telephony risk score calculator programmed to determine at least one audio channel fraud risk score from audio channel data associated with the individual, the audio channel data comprising at least one of an emotion or stress extracted from an audio signal representing a voice sample of the individual when the individual responded to specific questions designed to trigger stress in fraudsters but not in legitimate callers, the voice sample of the individual, and keywords extracted from the audio signal of the voice sample, the telephony fraud risk score calculator further programmed to determine at least one non-audio channel fraud risk score from non-audio channel data associated with the individual, the non-audio channel data comprising at least one of a type of telephony system used by the individual and a geographic location of the individual; and an aggregate risk score generator programmed to generate the fraud risk score based on an aggregate of at least audio channel fraud risk score and non-audio channel fraud risk score.

8. The risk score calculator of claim 7, wherein the telephony system comprises one of a Public Switched Telephone Network, a mobile phone, and Voice Over Internet Protocol network.

9. The risk score calculator of claim 7, wherein the non-audio channel data comprises at least one of a phone number called from, a phone number called to, a time duration for which the individual has had the phone number, a call frequency to /from the phone number called from, the area code of the phone number called from, a number of routing hops needed to complete the call, geography associated with an area code of the phone number called from, geographical location of the individual, whether the individual called from an expected phone number or a non-published number, whether the phone number is being call-forwarded and when that call-forward was initiated, an identity data, transaction data, and Short Message Service channel data.

10. The risk score calculator of claim 9, wherein the identity data comprises at least one of a name of the individual, a Social Security Number of the individual, an address of the individual, a phone number from which the individual called, and information related to background of the individual.

11. The risk score calculator of claim 10, wherein the information related to the background of the individual includes at least one of previous addresses lived at, persons that the individual shared a residence with, mother's maiden name, and a color of a first car.

12. The risk score calculator of claim 7, wherein the at least one audio channel fraud risk score includes a voice match score based on a match between a voice print of a known fraudster and the individual.

13. A tangible computer readable medium containing a computer program product for generating a fraud risk score representing a fraud risk associated with an individual, the computer program product comprising:

program code for calculating an audio channel fraud risk score from audio channel data comprising at least one of an emotion or stress extracted from an audio signal representing a voice sample of the individual when the individual responded to specific questions designed to trigger stress in fraudsters but not in legitimate callers, the voice sample of the individual, and keywords extracted from the audio signal of the voice sample;

program code for calculating a non-audio channel fraud risk score from non-audio channel data of the individual, the non-audio channel data comprising at least one of a type of telephony system used by the individual and a geographic location of the individual; and program code for generating the fraud risk score based on the audio channel fraud risk score and the non-audio channel fraud risk score.

14. The computer program product of claim 13, wherein the telephony system comprises one of a Public Switched Telephone Network, a mobile phone, and Voice Over Internet Protocol network.

15. The computer program product of claim 13, wherein the non-audio channel data comprises at least one of a phone number called from, a phone number called to, a time duration for which the individual has had the phone number, a call frequency to /from the phone number called from, the area code of the phone number called from, a number of routing hops needed to complete the call, geography associated with an area code of the phone number called from, geographical location of the individual, whether the individual called from an expected phone number or a non-published number, whether the phone number is being call-forwarded and when that call-forward was initiated, an identity data, transaction data, and Short Message Service channel data.

16. The computer program product of claim 15, wherein the identity data comprises at least one of a name of the individual, a Social Security Number of the individual, an address of the individual, a phone number from which the individual called, and information related to background of the individual.

17. The computer program product of claim 16, wherein the information related to the background of the individual includes at least one of previous addresses lived at, persons that the individual shared a residence with, mother's maiden name, and a color of a first car.

* * * * *